US012755015B2

(12) United States Patent
Bushner et al.

(10) Patent No.: US 12,755,015 B2
(45) **Date of Patent: *Oct. 6, 2026**

(54) ANTIRANSOMWARE FILE ANALYSIS AND SCORING

(71) Applicant: Halcyon Tech, Inc., Austin, TX (US)

(72) Inventors: Robert Bushner, Homeland, CA (US); Alejandro Espinoza, San Marcos, CA (US); Srinivasa Kanamatha, Portland, OR (US); Kristen Lamb, Austin, TX (US); Thanh Le, Carlsbad, CA (US); Seagen Levites, Oregon City, OR (US); Clark Lindsey, Loudon, TN (US); Jorge Medina, Taby (SE); Jonathan Miller, Poway, CA (US); Ryan Smith, Austin, TX (US); Vu Ta, Fellbach (DE); Kyle West, Austin, TX (US)

(73) Assignee: Halcyon Tech, Inc., Austin, TX (US)

( * ) Notice: Subject to any disclaimer, the term of this patent is extended or adjusted under 35 U.S.C. 154(b) by 56 days.

This patent is subject to a terminal disclaimer.

(21) Appl. No.: 18/974,456

(22) Filed: Dec. 9, 2024

(65) Prior Publication Data

US 2025/0342252 A1 Nov. 6, 2025

Related U.S. Application Data

(63) Continuation of application No. 18/655,095, filed on May 3, 2024, now Pat. No. 12,229,261.

(51) Int. Cl.
*G06F 21/56* (2013.01)

(52) U.S. Cl.
CPC ...... *G06F 21/565* (2013.01); *G06F 2221/034* (2013.01)

(58) Field of Classification Search
CPC ...... G06F 21/56–568; G06F 2221/034; G06N 20/00
See application file for complete search history.

(56) References Cited

U.S. PATENT DOCUMENTS 11,636,198 B1 * 4/2023 Kulkarni .................... G06F 8/65 726/22
12,483,589 B1 * 11/2025 Cheh .................... H04L 12/4641
(Continued)

FOREIGN PATENT DOCUMENTS

WO WO-2020111504 A1 * 6/2020 ............. G06F 21/56

*Primary Examiner* — Trong H Nguyen
(74) *Attorney, Agent, or Firm* — Jones Day

(57) ABSTRACT

A notification message is received indicating an upload of a file to a cloud service. An analysis engine (which can execute one or more machine learning models or other analysis operations) can generate information that characterizes the file which can be indicative of a level of trustworthiness for the file. In response to the generated information, each of a plurality of judges are notified to commence or revisit a judging process. In response to the notifications, the judges (which can execute one or more machine learning models or other analysis operations) retrieve the generated information and determine a respective trustworthiness score for the file. These scores can be stored in a corresponding judge database and/or data can be provided which characterizes the determined trustworthiness scores to a consuming application or process. Related apparatus, systems, techniques and articles are also described.

30 Claims, 6 Drawing Sheets

(56) References Cited

U.S. PATENT DOCUMENTS

| | | | | |
|---|---|---|---|---|
| 2015/0180890 | A1* | 6/2015 | Ronen | H04L 63/1416 726/23 |
| 2018/0159889 | A1* | 6/2018 | Sjouwerman | G06F 21/56 |
| 2019/0116030 | A1* | 4/2019 | Wiacek | H04L 9/0861 |
| 2023/0077289 | A1* | 3/2023 | Sloane | G06F 9/547 |
| 2023/0185915 | A1* | 6/2023 | Rao | G06F 21/564 726/22 |
| 2023/0325501 | A1* | 10/2023 | Chhetri | G06F 21/566 726/24 |
| 2023/0418942 | A1* | 12/2023 | Lovmand | G06F 21/552 |
| 2024/0176869 | A1* | 5/2024 | Idrizovic | G06F 21/53 |

* cited by examiner

ANTIRANSOMWARE FILE ANALYSIS AND SCORING

RELATED APPLICATION

The current application claims priority to U.S. patent application Ser. No. 18/655,095 filed on May 3, 2024, the contents of which are hereby fully incorporated by reference.

TECHNICAL FIELD

The subject matter described herein relates to a platform for characterizing trustworthiness of files uploaded into a file system (e.g., cloud service serving multiple tenants, on-premise solution, etc.).

BACKGROUND

Cybersecurity threats such as ransomware are designed to evade modern security tools by delivering files within a computing environment which include code which, when executed, implement various malicious activities. Given the increasing sophistication of these threats, files may bypass tools within the computing environment resulting in problematic files being stored or accessed.

SUMMARY

In one aspect, a notification message is received indicating an upload of a file to a cloud service. An analysis engine (which can execute one or more machine learning models or other analysis operations) can generate information that characterizes the file which can be indicative of a level of trustworthiness for the file. In response to the generated information, each of a plurality of judges are notified to commence or revisit a judging process. In response to the notifications, the judges (which can execute one or more machine learning models or other analysis operations) retrieve the generated information and determine a respective trustworthiness score for the file. These scores can be stored in a corresponding judge database and/or data can be provided which characterizes the determined trustworthiness scores to a consuming application or process.

The generated information can characterize different aspects of the file such as attributes or capabilities which can, in turn, be used by the analysis engine to determine and intent of the file (e.g., administrative file, ransomware, etc.). The attributes can indicate, for example, whether the file: is packed, is signed, is encrypted, includes causing other files to be encrypted, includes code causing deletion of files, or includes code causing files to be uploaded.

In some cases, the plurality of judges are associated with a single endpoint (i.e., computing device, etc.), process, service or session and comprise a subset of available judges while other judges are associated with one or more other endpoints, processes, services and/or sessions. In other cases, the plurality of judges can be associated with a pre-defined group of endpoints, processes, services, and/or sessions and comprise a subset of available judges while other judges are associated with groups of one or more other endpoints, processes, services, and/or sessions. In some variations, the plurality of judges are associated with a single tenant (e.g., a single cloud customer accessing shared computing resources) and comprise a subset of available judges while other judges are associated with one or more other tenants (e.g., other cloud customers sharing those same computing resources).

The new file notification message can be a simple queue service (SQS) service.

Each of the judges can comprise or execute a different type of machine learning model. In some variations, at least two of the judges can comprise or execute a same type of machine learning model which are uniquely trained.

The consuming application or process can initiate a remediation action in response to at least one of the provided determined trustworthiness scores. The remediation action can include, for example, quarantining the file, deleting the file, preventing access to the file, or initiating one or more antiransomware obfuscation processes.

A worker can process the file notification message for ingestion by a pipeline. The pipeline can coordinate workflows with each of a plurality of analyzers.

The cloud service can serve multiple tenants and the determined trustworthiness scores can be stored on a tenant-by-tenant basis.

In an interrelated aspect, a query is received requesting a score for a file stored by a file management system (e.g., cloud service, on-premise storage, etc.). Thereafter, a tenant identification (ID) is determined for the query. A judge database associated with the tenant ID is queries for the score and this score is returned to the requestor (e.g., endpoint, process, service, session, etc.).

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for characterizing the trustworthiness of a file which can be triggered when such files are uploaded to a cloud storage service.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to a file analysis and scoring system which allows for automated and on-demand processing of executable files to extract intelligence and to decide on what action to take on devices (e.g., nodes, computing devices, etc.) that attempt to access or otherwise find such files. This system can be used to identify files having malicious content and, in particular, to identify files likely to contain or initiate undesired actions such as the deployment of malware such as ransomware. Trustworthiness scores for a file can be determined using different judges which can be specifically tailored to the requestor (e.g., endpoint or other computing device, process, service, session, tenant, etc.).

Figure 1:
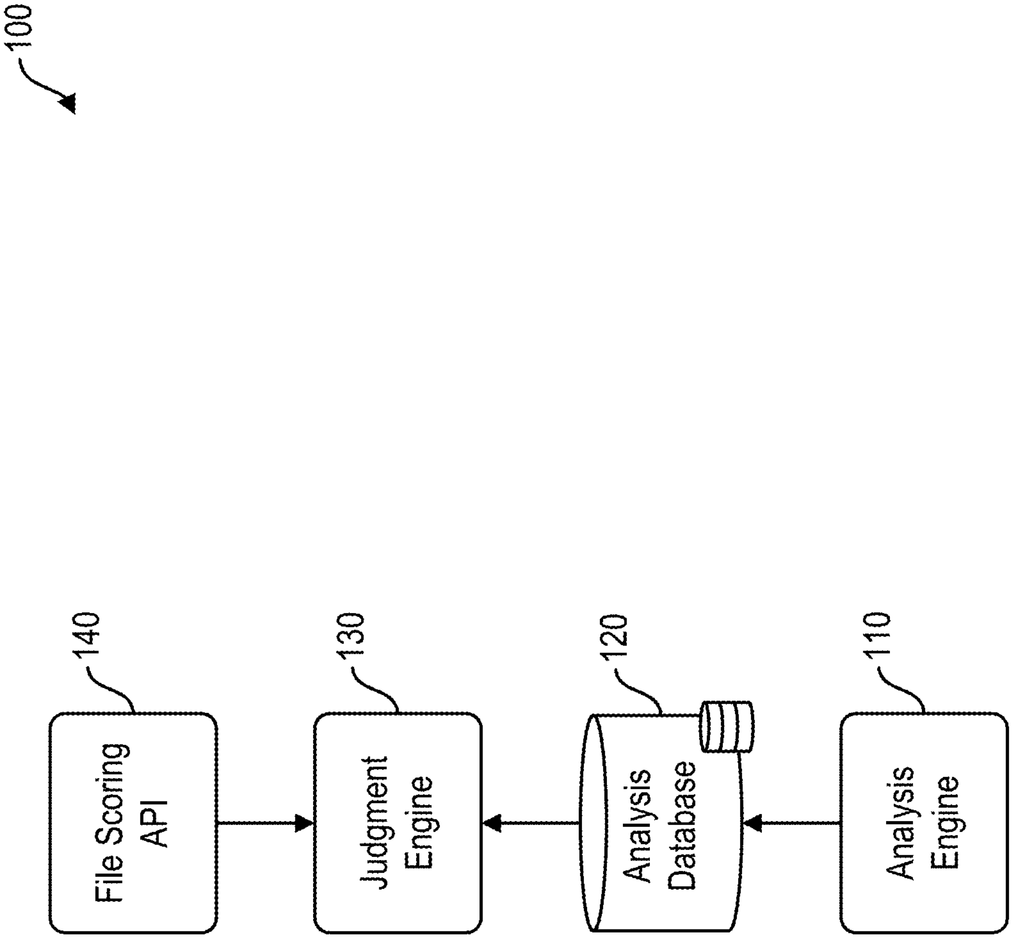
FIG. 1 is an architecture diagram illustrating components of a file analysis and scoring system.

FIG. 1 is a high level architecture diagram 100 comprising an analysis engine 110, an analysis database 120, a judgment engine 130, and a file scoring application programming interface (API) 140 which collectively can comprises one or more servers or other computing devices with associated memory and storage. The analysis engine 110 can be coupled to one or more cloud storage services and can analyze new files when they are uploaded into such cloud storage services. Upon a triggering event associated with a file, the analysis engine 110 generates analysis information (e.g., a report, etc.) about the file. The analysis engine 110 in some variations extracts and/or generates attributes from the file which characterize and stores such features within the analysis database 120. This analysis information can then be utilized by the judgment engine 130 to score the file (as described in further detail below) to characterize aspects such as trustworthiness, safety of the file and the like. In some cases, the analysis engine 110 can execute a plurality of different analyzers (e.g., portable executable parser, machine learning models, rules, etc.) in order to receive features or other attributes which characterize the file (e.g., self-extracting executable, packed executable, ransomware, administrator file, etc.). The analysis engine 110 can be configured, in some variations, to have different policies for different tenants or different endpoints. Such policies can, for example, dictate which features might be extracted for a particular file and can differ between tenants (for that particular file). In addition or in the alternative, the judgment engine 130 can be configured to have different policies for different tenants. Such policies can, for example, dictate how a file is ultimately scored (e.g., through different scoring weights, by using different features, etc.).

The analysis engine 110 can comprise a worker module which utilize a plurality of workers to perform tasks in parallel to extract messages (e.g., SQS message) and route such messages through a pipeline for processing by a particular processor. The messages, for example, can be from a message queuing service which routes messages for consumption by various software components. The processors can, for example, each correspond to a different analyzer or group of analyzers for extracting attributes or other features from the file. The pipeline can act as a central broker which coordinates workflows that use external processing units and causes the files to be processed by a respective processor while keeping track of processor availability and results.

The file scoring API 140 provides an interface for access to cloud-based data assets including uploading of files and/or accessing files through queries and the like. The file scoring API 140 can take various configurations including a metadata management and governance system which facilitates gathering, processing, and maintaining metadata about cloud-based data assets. The file scoring API 140 can be used by remote computing devices to get scores generated by the judgment engine 130 which are associated with the requestor (endpoint, tenant, etc.). These scores can then be used by such remote computing devices to make a determination of whether or not to access the file. In some variations, the query itself causes the judgment engine 130 to score files responsive to the query.

Figure 2:
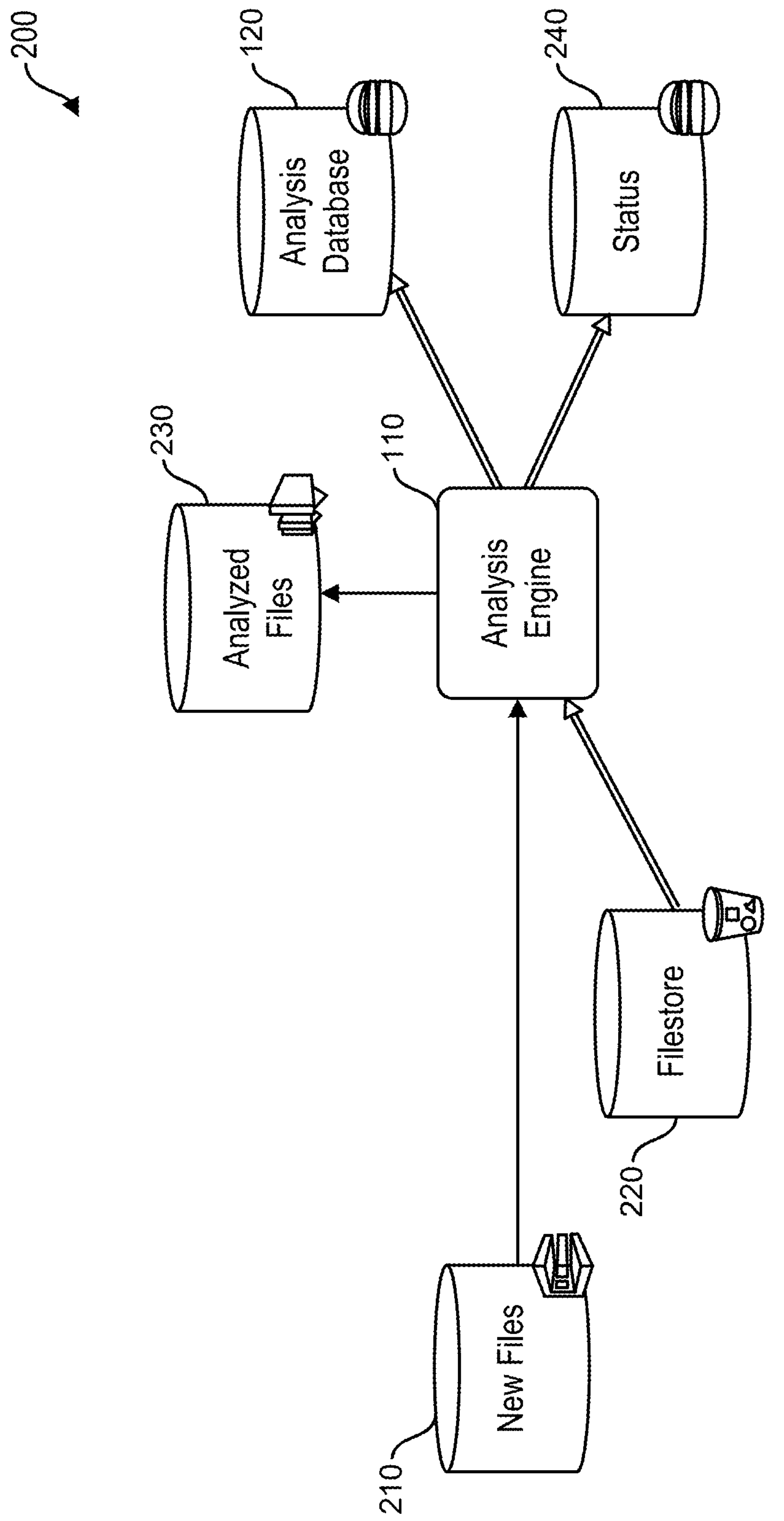
FIG. 2 is an architecture diagram illustrating aspects of the analysis engine of FIG. 1.

FIG. 2 is a diagram 200 illustrating additional details with regard to the analysis engine 110. The analysis engine 110 can receive a queue of new files stored in or otherwise loaded into a new files queue 210. The presence of these files in the new files queue 210 can be signaled, for example, by way of Simple Queue Service (SQS) messages. Various fetching parameters can be specified such as number of SQS messages to read a single pass, how long to wait for new messages, number of seconds to sleep after a batch, etc. The analysis engine 110 can also receive additional information regarding the files from a filestore 220 (e.g., metadata, etc.). The result of the analysis engine 110 (i.e., the analysis information) can be stored in an analyzed files queue 230 which then notifies the judgment engine 130 of a new file to be scored. The analysis database 120 can comprise a set of tables that hold all of the analysis data generated by the analysis engine 110 and a status database 240 can store the status of all files being processed.

Figure 3:
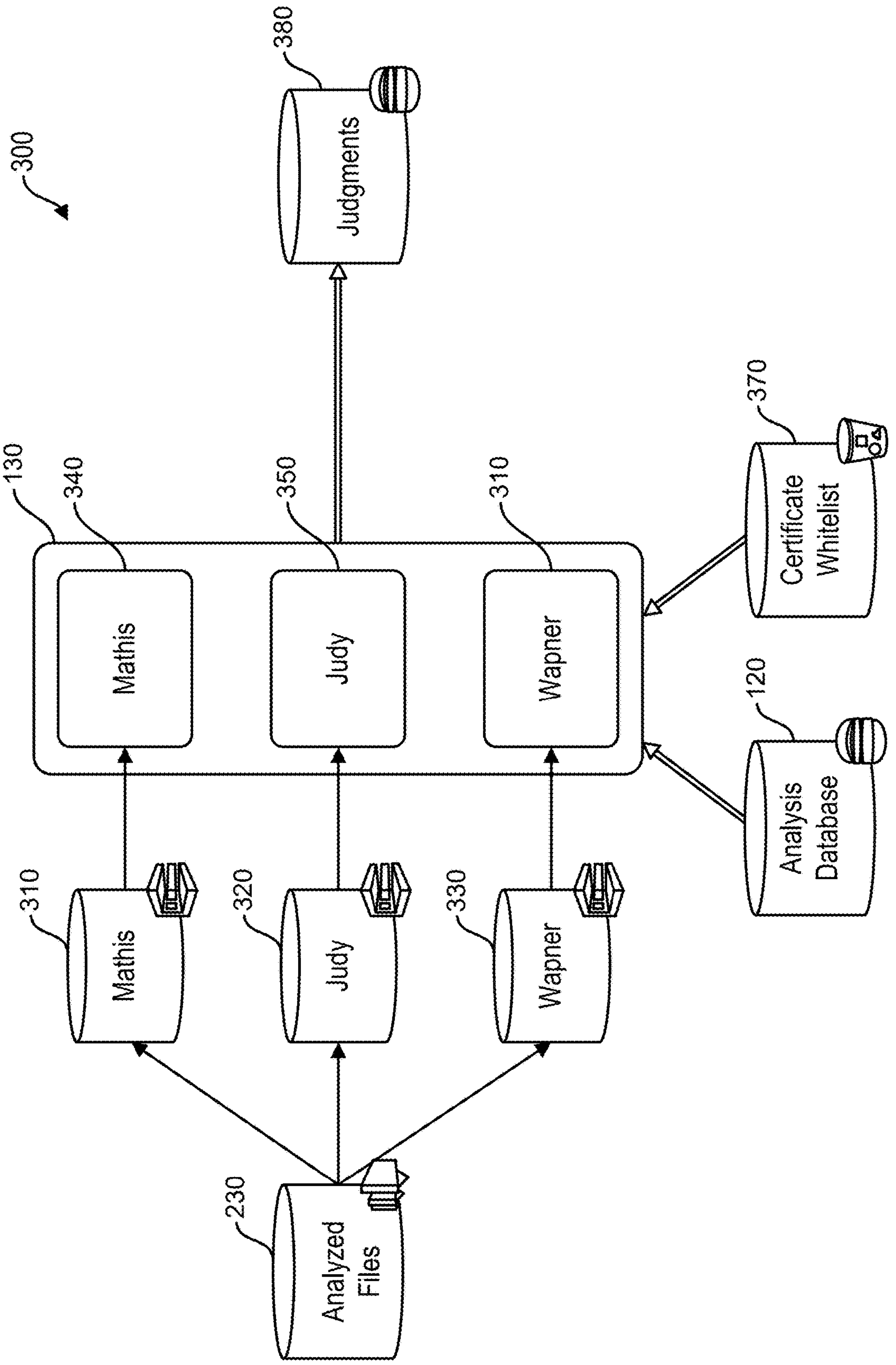
FIG. 3 is an architecture diagram illustrating aspects of the judgment engine of FIG. 1.

FIG. 3 is a diagram 300 illustrating additional aspects regarding the judgment engine 130. Files in the analyzed files queue 230 can be routed to respective data queues 310, 320, 330 which are each associated with a respective judge 340, 350, 360 executed by the judgment engine 130. It will be appreciated that there can be varying number of judges depending on the desired configuration. Judge in this context refers to one or more processes (e.g., a machine learning-based scoring algorithm, classifier, rules engine, etc.) resulting in a verdict/trustworthiness score. Trustworthiness, in this context, relates to whether the file is deemed to be malicious and, in some cases, more specifically as ransomware.

Judges 340, 350, 360 in response to a trigger (e.g., expiration of an amount of time, a message, etc.) will access any files in the corresponding queue 310, 320, 330 and generate, for each file, a score (also referred to as a judgment). This score can, for example, be binary (malicious/safe) or it can be a numerical indicator. These scores can be stored in a judgments database 380. The judges 340, 350, 360 can execute the same or different models depending on the desired configuration. With the former, the models may be trained differently causing different outputs. With the latter and for example, the models can differ such as one of the judges being more aggressive towards AutoIT files or other anomalies which results in different actions being implemented.

In some cases, certain files can be certified as being part of an allowlist and stored in a corresponding certificate allowlist database 370. This certification can be used to segregate or otherwise insulate certain files from the judgment process and/or alternatively files having a score above a pre-defined level can be added to the certificate allowlist database 370. Other files (i.e., those that are not part of the certificate allowlist), can be stored in the analysis database 120. In some cases, the analysis database 120 can include tables for all analyzed files.

Figure 4:
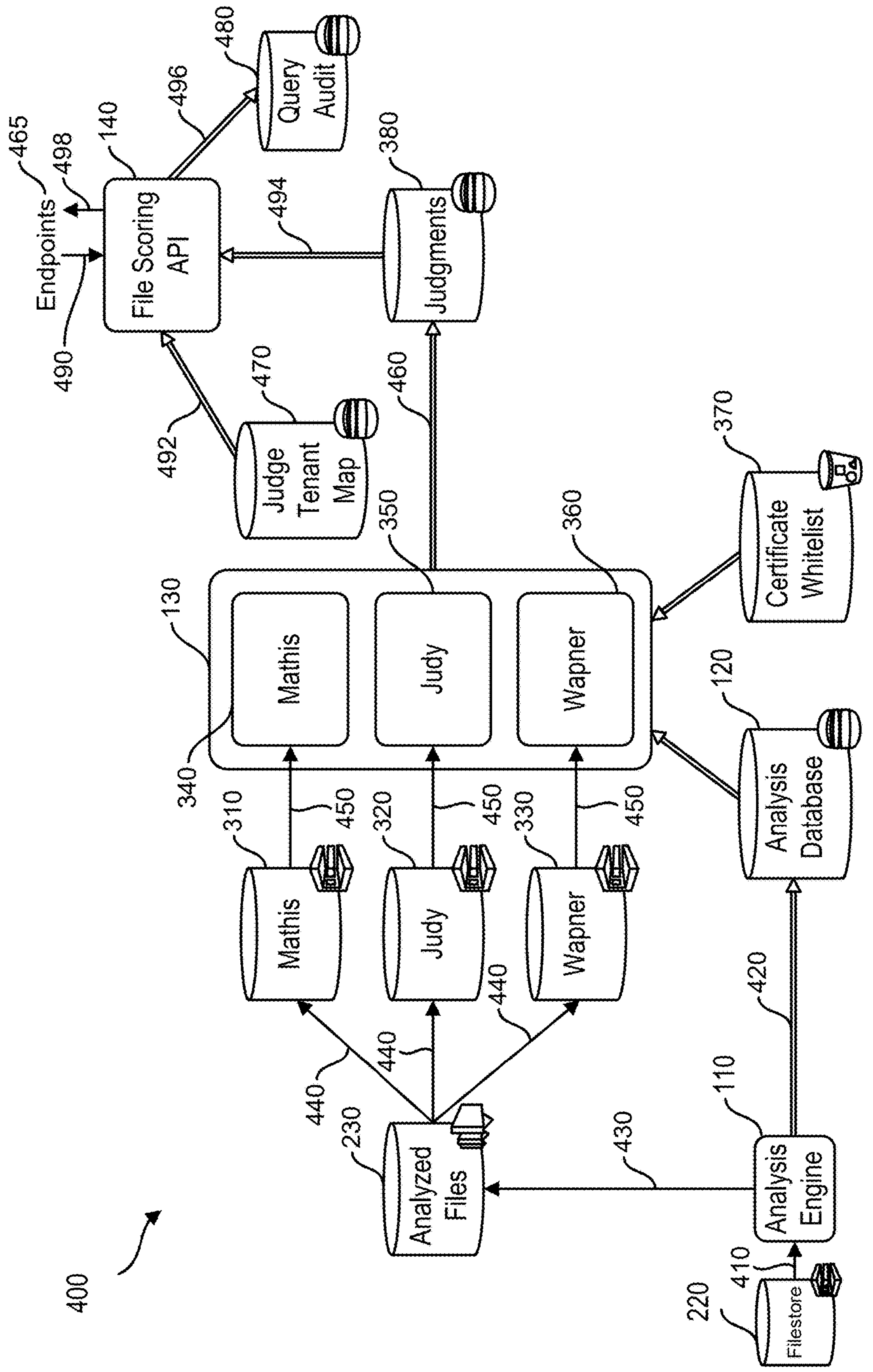
FIG. 4 is an architecture diagram illustrating additional components of the file analysis and scoring system and processes amongst such components.

FIG. 4 is a diagram 400 illustrating a process for uploading new files. Initially, at 410, a new file is uploaded to the filestore 220 which triggers a new file notification message in SQS to be sent to the analysis engine 110. A cryptographic hash of the file (i.e., a file encrypted using a hashing algorithm such as SHA-256 can be passed as a parameter as part of the initial upload. This file hash can be used as a unique identifier for the file. In some variations, other types of unique identifiers can be used such as UUIDs or GUIDs. A unique identifier is advantageous in that it prevents duplication and also provides a level of security (i.e., one must possess or have knowledge from another entity that possess the file in order to ask about it, etc.). In response, the analysis engine 110 retrieves or otherwise obtains the new file and analyzes it with the selected pipeline (i.e., the analysis engine 110 generates information characterizing the new file). The analysis engine 110, at 420, transmits the analysis information (e.g., a report from the analyzer(s) forming part of the analysis engine 110) for storage it the analysis database 120.

The analysis engine 110, as part of the generated analysis information, can perform operations to classify or otherwise characterize the attributes and capabilities of the file. As an example, the analysis engine 110 can determine that a particular file is an administrative tool based on the API set that the file uses. As another example, the analysis engine 110 can determined that the file is ransomware based on the operations that it performs when one or more analyzers are run. The analysis engine 110, as part of the generated analysis information, can additionally or alternatively extrapolate the intent and purpose of the file. The analysis information can also characterize one or more aspects indicative of ransomware such as whether the file is packed, is signed, is encrypted (or includes code causing encryption), includes code causing deletion of files, and/or includes code causing files to be uploaded. The analysis information can also specify categories or functionality that is inferred by a model (i.e., one of the analyzers within the analysis engine 110) and/or provide information regarding the presence of certain content within the file, similarity hashes regarding the file, certificates used to sign the file, etc.

When the analysis is complete, the analysis engine 110, at 430, sends a notification to select judges 340-370 that a new file is ready to be judged. Judges 340-370 can be assigned to tenants or devices. In some variations, the judges 340-370 can be assigned to tenants based on the best set of detections that can be had for that specific tenant. As an example, it may be reasonable to have a Chicago office-only organization to use a judge (e.g., a machine learning model) 340-370 that has a high false positive rate on Chinese executables, but would be unreasonable to expect that same judge would work well for an organization that has an office within China. Additionally, some organizations require grayware to run due to the fact that there is no universal standard for security hygiene that specifies things to this level of granularity. On the device level, there may be a device that the organization allows to be out of sync with their normal mode of operation. In a case such as that, the device itself can be assigned to a different judge 340-370.

Thereafter, at 440, a notification system creates a new task for each judge 340-370 in their personal queue 310-330. Each judge 340-370, in parallel and at 450, then takes the requested file hash from its queue 310-330 and continues to analyze the file hash to create a verdict. Each judge 340-370, at 460, then issues a verdict on each file and causes the results to be stored in the judgments database 380.

With further reference to FIG. 4, an endpoint 465 (e.g., a remote computing device, client, etc.), at 490, queries the file scoring API 140 for a score (e.g., a trustworthiness score, etc.) for a particular file. The file scoring API, in response at 492, uses an endpoint identification (ID) in the query to find a matching tenant ID and matching judges. The matching can be performed using a judge tenant map 470. The file scoring API 140 then, at 494, queries the judgment database 380 using the tenant for judgments from the matching selected judge and retrieves the score (which may be based on an individual verdict or a combination of verdicts, etc.). The file scoring API, at 496, records information characterizing the query and the retrieved score in a query audit data store 480. Lastly, at 498, the file scoring API can return the retrieved score to the requesting endpoint 495.

The verdicts/trustworthiness scores can be consumed by a downstream application or process. In some variations, such application or process can trigger or otherwise initiate a remediation action in response to one or more of the verdicts/trustworthiness scores. These remediation actions can take various forms including quarantining the file, deleting the file, blocking access to the file, and/or or initiating one or more antiransomware obfuscation processes. A particular value for the verdict/trustworthiness score can trigger different remediation actions. Stated differently, the relative value of trustworthiness (e.g., low risk, medium risk, high risk, etc.) can cause different remediation actions (e.g., remediation actions commensurate with the associated risk).

Figure 5:
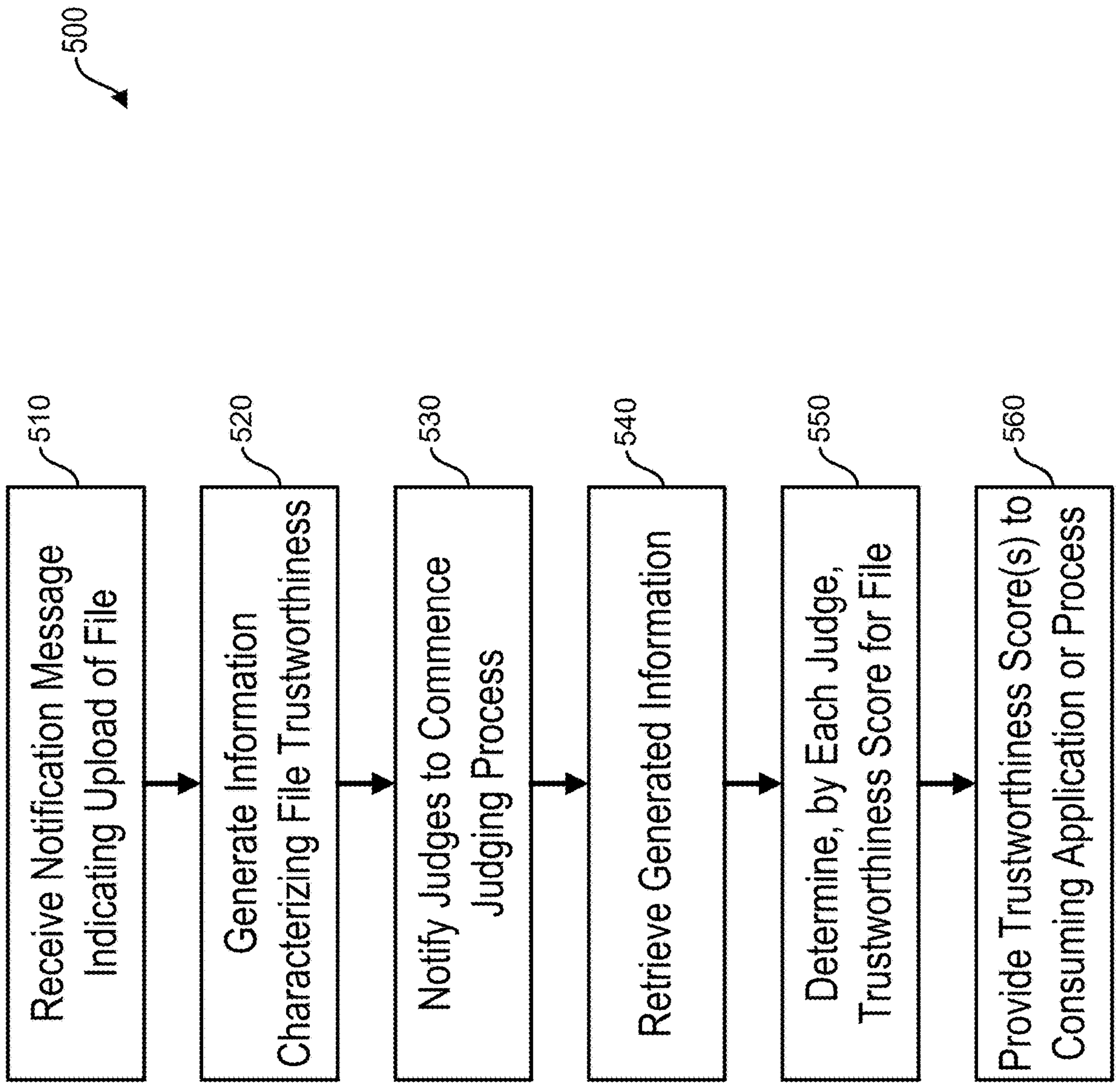
FIG. 5 is a process flow diagram illustrating operations triggered when a file is uploaded to a cloud service.

FIG. 5 is a diagram 500 in which, at 510, a notification message is received which indicates that a file has been uploaded to a file management system (e.g., cloud service, on-premise storage, etc.). Thereafter, at 520, an analysis engine generates information (e.g., analysis information, etc.) characterizing the file and which is indicative of a level of trustworthiness of the file. Trustworthiness can refer to whether the file contains malware such as ransomware. In response to the generated information, at 530, each of a plurality of judges are notified to commence or revisit a judging process. The judges, at 540, can retrieve the generated information in response to the notification. Such retrieved information, as described above, can be from a particular queue associated with the corresponding judge. The judges, at 550, each determine a respective trustworthiness score the file. Such determination can, for example, be based on inputting the generated information into one or more machine learning models (e.g., single machine learning model, ensemble of machine learning models, etc.) resulting in the respective trustworthiness score. In some variations, the judges execute different scoring algorithms which result in varying scores. Data characterizing the determined trustworthiness score can, at 560, be provided to a downstream consuming application or process. In some cases, individual scores are transmitted while, in other variations, a combined score (i.e., a score based on fusing each of the trustworthiness scores, etc.) can be transmitted.

Figure 6:
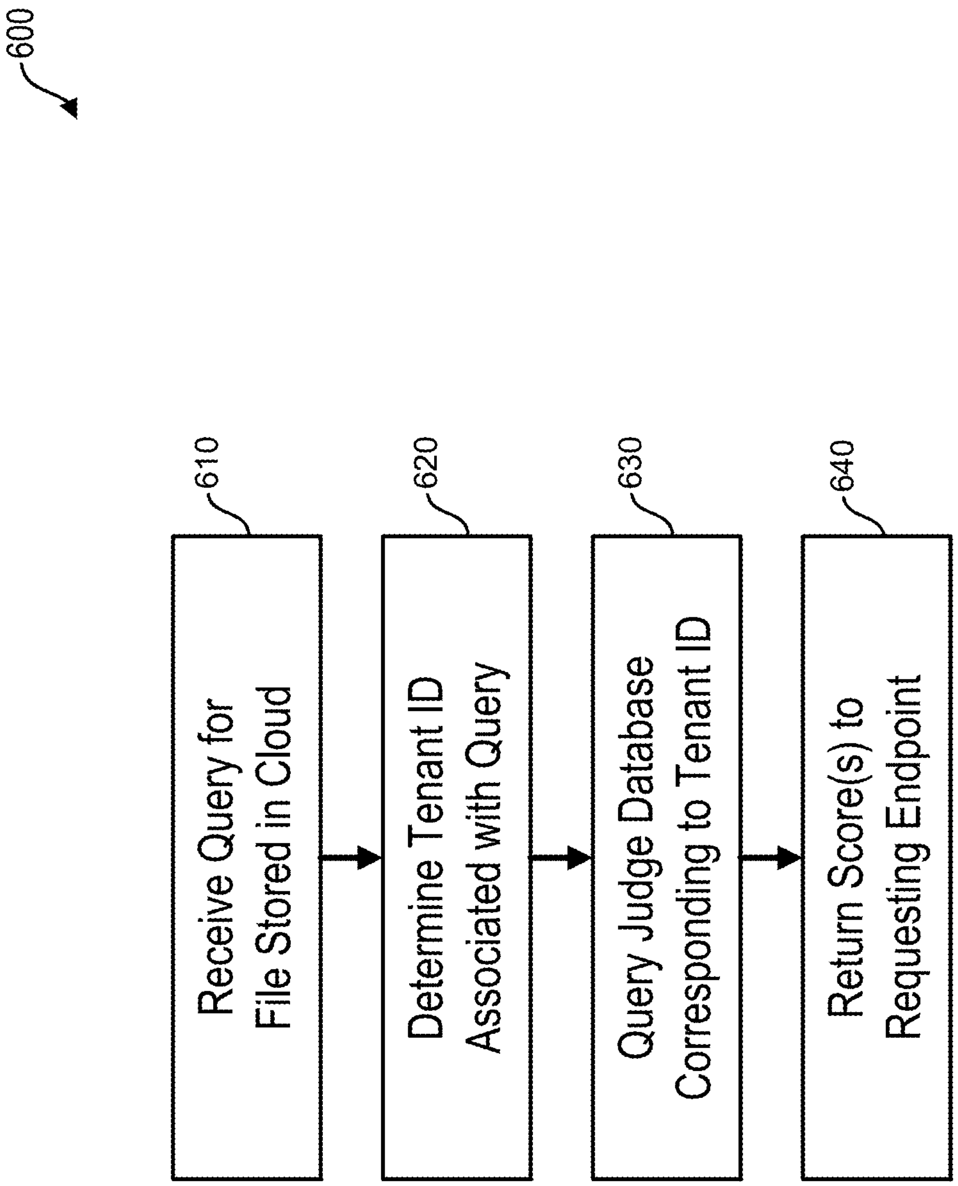
FIG. 6 is a process flow diagram illustrating operations triggered when a query for a trustworthiness score is received.

FIG. 6 is a diagram 600 in which, at 610, a query is received from a requestors (e.g., endpoint, computing device, process, session, service, etc.) requesting a score for a file stored by a file management system (e.g., cloud service, on-premise storage system, etc.). A tenant or other ID is then determined, at 620, for the query. This ID is used, at 630, to query a judge database associated with the ID for the score. The score is returned, at 640, to the endpoint.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device. Further, while the description above is largely focused on ransomware countermeasures, the current subject matter is applicable to analysis of files to prevent them from causing any undesired behavior including other actions associated with different types of malware.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED, OLED, or LCD screen/monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:

receiving a query requesting a score for a file stored by a file management system;

determining a tenant identification (ID) for the query;

querying, using a judge tenant map that maps tenant IDs to matching judges, a judgment database for the score from a judge matching the tenant ID; and returning the score to an endpoint;

wherein:

the judges are a plurality of machine learning-based judges each having an associated judge database, each of the judges being executed by a judgment engine;

an analysis engine generates information characterizing each file which is indicative of a level of trustworthiness, the generated information comprising one or more of attributes indicative of ransomware;

each of the judges is notified to commence or revisit a judging process based on the generated information;

each of the judges retrieves the generated information in response to the notifying;

each of the judges comprises or executes a corresponding machine learning model to determine a respective trustworthiness score for each file based on the generated information; and the determined trustworthiness scores are stored in the associated judge databases.

2. The method of claim 1, wherein the analysis engine generates the information characterizing each file by extracting features from each file.

3. The method of claim 1, wherein the analysis engine generates the information characterizing each file by inferring attributes and capabilities of each file.

4. The method of claim 1, wherein the analysis engine generates the information characterizing each file by determining a purpose of each file.

5. The method of claim 1, wherein the judges are associated with a single tenant and comprise a subset of available judges, wherein other judges are associated with one or more other tenants.

6. The method of claim 1, wherein each of the judges comprises a different type of machine learning model.

7. The method of claim 1, wherein at least two of the judges comprise a same type of machine learning model which are uniquely trained.

8. The method of claim 1, wherein the attributes indicative of ransomware characterize one or more of whether each file: is packed, is signed, is encrypted, causes other files to be encrypted, includes code causing deletion of files, or includes code causing files to be uploaded.

9. The method of claim 1, wherein each of the judges determines the respective trustworthiness score in parallel with each other judge.

10. The method of claim 1, further comprising generating a cryptographic hash of each file and passing the cryptographic hash as a unique identifier for each file.

11. The method of claim 1, further comprising: certifying one or more files as being part of an allowlist; storing the certified one or more files in a certificate allowlist database; and insulating the certified one or more files from the judging process.

12. The method of claim 11, further comprising adding a particular file to the certificate allowlist database in response to a respective trustworthiness score for the particular file exceeding a pre-defined threshold.

13. The method of claim 1, wherein the judgment engine is configured with a scoring policy specific to a tenant, the scoring policy dictating at least one of: different scoring weights applied to the generated information, or different features of the generated information used to determine the respective trustworthiness score.

14. The method of claim 1, wherein the generated information further characterizes one or more of: a similarity hash of each file, or a certificate used to sign each file.

15. The method of claim 1, wherein the determined trustworthiness scores are stored on a tenant-by-tenant basis.

16. A system comprising:

at least one data processor; and memory storing instructions, which when executed by the at least one processor, result in operations comprising:

receiving a query requesting a score for a file stored by a file management system;

determining a tenant identification (ID) for the query;

querying, using a judge tenant map that maps tenant IDs to matching judges, a judgment database for the score from a judge matching the tenant ID; and returning the score to an endpoint;

wherein:

the judges are a plurality of machine learning-based judges each having an associated judge database, each of the judges being executed by a judgment engine;

an analysis engine generates information characterizing each file which is indicative of a level of trustworthiness, the generated information comprising one or more of attributes indicative of ransomware;

each of the judges is notified to commence or revisit a judging process based on the generated information;

each of the judges retrieves the generated information in response to the notifying;

each of the judges comprises or executes a corresponding machine learning model to determine a respective trustworthiness score for each file based on the generated information; and the determined trustworthiness scores are stored in the associated judge databases.

17. The system of claim 16, wherein the analysis engine is further configured to generate the information characterizing each file by extracting features from each file.

18. The system of claim 16, wherein each of the judges comprises a different type of machine learning model.

19. The system of claim 16, wherein the attributes indicative of ransomware characterize one or more of whether each file: is packed, is signed, is encrypted, causes other files to be encrypted, includes code causing deletion of files, or includes code causing files to be uploaded.

20. The system of claim 16, wherein each of the judges determines the respective trustworthiness score in parallel with each other judge.

21. The system of claim 16, further comprising a certificate allowlist database configured to store one or more certified files that are insulated from the judging process.

22. The system of claim 21, wherein a particular file is added to the certificate allowlist database in response to a respective trustworthiness score for the particular file exceeding a pre-defined threshold.

23. The system of claim 16, wherein the judgment engine is configured with a scoring policy specific to a tenant associated with the query, the scoring policy dictating at least one of: different scoring weights applied to the generated information, or different features of the generated information used to determine the respective trustworthiness score.

24. The system of claim 16, wherein the generated information further characterizes one or more of: a similarity hash of each file, or a certificate used to sign each file.

25. The system of claim 16, wherein the file management system is a cloud-based file management system that serves multiple tenants, and wherein the determined trustworthiness scores are stored on a tenant-by-tenant basis.

26. A method comprising:

receiving a query requesting a score for a file stored by a cloud-based file management system that serves multiple tenants;

determining a tenant identification (ID) for the query based on an identification of an endpoint in the query;

querying, using a judge tenant map that maps tenant IDs to matching judges, a judgment database for the score from a judge matching the tenant ID; and returning the score to the endpoint;

wherein:

the judges are a plurality of machine learning-based judges each having an associated judge database and a respective data queue, each of the judges being executed by a judgment engine;

an analysis engine generates information characterizing each file which is indicative of a level of trustworthiness, the generated information comprising one or more attributes indicative of ransomware including whether each file is packed, is signed, is encrypted, causes other files to be encrypted, includes code causing deletion of files, or includes code causing files to be uploaded;

each of the judges is notified to commence or revisit a judging process based on the generated information;

each of the judges retrieves the generated information from the respective data queue associated with the judge in response to the notifying;

each of the judges comprises or executes a corresponding machine learning model to determine, in parallel with each other judge, a respective trustworthiness score for each file based on the generated information; and the determined trustworthiness scores are stored in the associated judge databases on a tenant-by-tenant basis.

27. The method of claim 26, wherein the judgment engine is configured with a scoring policy specific to each tenant, the scoring policy dictating both different scoring weights applied to the generated information and different features of the generated information used to determine the respective trustworthiness score.

28. The method of claim 26, further comprising: certifying one or more files as being part of an allowlist; storing the certified one or more files in a certificate allowlist database; insulating the certified one or more files from the judging process; and automatically adding a particular file to the certificate allowlist database in response to a respective trustworthiness score for the particular file exceeding a pre-defined threshold for a predetermined number of consecutive evaluations.

29. The method of claim 26, wherein each of the judges comprises a different type of machine learning model, and wherein at least one of the judges is trained using training data specific to a tenant.

30. The method of claim 26, wherein the analysis engine generates the information characterizing each file by extracting features from each file, inferring attributes and capabilities of each file, and determining a purpose of each file.

* * * * *